United States Patent [19]
Ito

[11] 3,815,045
[45] June 4, 1974

[54] METHOD OF AND DEVICE FOR MODULATING DIRECTLY A SEMICONDUCTOR LASER

[75] Inventor: Ryoichi Ito, Hino, Japan
[73] Assignee: Hitachi, Ltd., Tokyo, Japan
[22] Filed: Oct. 6, 1972
[21] Appl. No.: 295,655

[52] U.S. Cl. ... 331/94.5 M, 317/235 R, 331/94.5 H, 332/7.51, 350/96 WG
[51] Int. Cl. ............................................. H01s 3/00
[58] Field of Search .......... 350/96 WG; 331/94.5 H, 331/94.5 C, 94.5 M; 332/7.51; 317/235

[56] References Cited
UNITED STATES PATENTS
3,157,726  11/1964  Hicks ........................... 350/96 WG
3,680,001  7/1972  Paoli et al. ..................... 331/94.5 H OTHER PUBLICATIONS
Ripper et al.: "Stripe–Geometry Double Heterostructure Junction Lasers," Applied Physics Letters, Vol. 18, pp. 155-157, Feb. 15, 1971.

Primary Examiner—Edward S. Bauer
Attorney, Agent, or Firm—Craig & Antonelli

[57]  ABSTRACT

A method of modulating directly a semiconductor laser such that a laser beam of one mode-order emitted from the semiconductor laser is converted into that of another mode-order by a pulse current superposed on a bias current flowing through the semiconductor laser and one of said two mode-orders is transmitted selectively through an optical guide, so that the amplitude of the laser beam can be modulated without stopping laser emission and the modulation at high repetition frequencies and with low modulating power can be obtained.

16 Claims, 10 Drawing Figures

TE$_{00}$ MODE    TE$_{01}$ MODE    TE$_{02}$ MODE

FIG. 2b
FIG. 2c
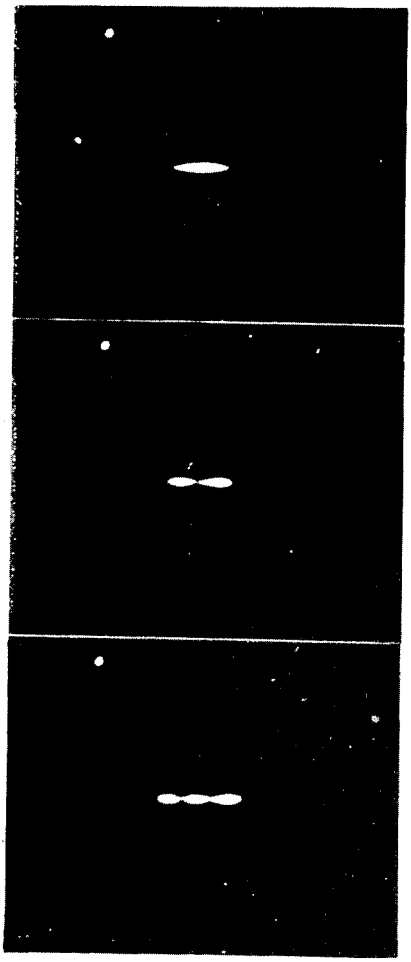
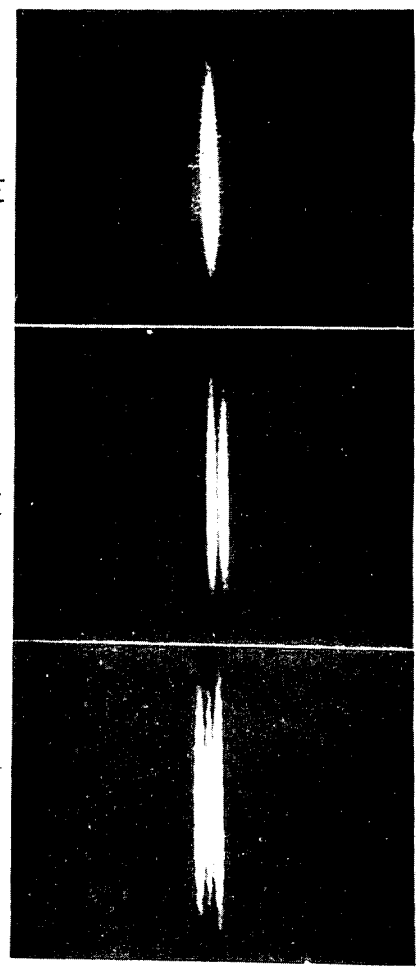
TE$_{00}$ MODE
TE$_{01}$ MODE
TE$_{02}$ MODE

METHOD OF AND DEVICE FOR MODULATING DIRECTLY A SEMICONDUCTOR LASER

This invention relates to a method and device for directly modulating by means of an external signal a laser beam emitted from a semiconductor laser.

It is commonly known that the amplitude (intensity) of a laser beam emitted from a semiconductor laser can be modulated by modulating the injection current supplied to the semiconductor laser. Thus, when a semiconductor laser is used as a source of light in light communications, the laser beam which is the carrier can be directly modulated by the injection current.

However, a period of time of one to several ten nanoseconds is generally required until a laser beam is emitted from a semiconductor laser after the injection current has been supplied to the semiconductor laser. This delay is considerable especially when the value of the injection current supplied to the semiconductor laser is nearly equal to the threshold current level of laser emission. (J. C. Dyment and J. E. Ripper, "Temperature Behavior of Stimulated Emission Delays in GaAs Diodes and a Proposed Trapping Model", IEEE Journal of Quantum Electronics, Vol. QE–4, page 155, 1968) Therefore, in the case of on-off of light as in PCM communication, it is difficult to carry out direct modulation of the kind above described with repetition frequencies higher than several hundred MHz. In order to overcome the above difficulty, a laser beam emitted continuously from a laser diode has heretofore been modulated by an external modulator, for example, a modulating means utilizing an opto-electrical crystal. However, such external modulation pays no regard to the excellent feature of semiconductor lasers which feature resides in the capability of direct modulation of the laser beam by the injection current. Further, provision of such external modulator results in a complex arrangement.

It is therefore a primary object of the present invention to provide a novel and improved method of directly modulating with a high repetition frequency of more than several hundred MHz a laser beam emitted from a semiconductor laser.

Another object of the present invention is to provide a modulating method capable of modulating with the high repetition frequency above described in spite of a simple construction and small power requirement.

In accordance with the present invention which attains the above objects, there is provided a method of modulating directly a semiconductor laser comprising supplying a bias current to the semiconductor laser to cause emission of a laser beam of one mode-order therefrom, superposing a modulating current on said bias current to change said mode-order thereby causing emission of a laser beam of another mode-order from the semiconductor laser, and passing said emitted laser beam of said two mode-orders through an optical path means capable of transmitting selectively one of said two mode-orders, whereby the amplitude of said emitted laser beam is modified directly by said modulating current without stopping the laser emission.

Laser emission including a plurality of kinds of transverse modes can be obtained with a semiconductor injection laser, especially a laser diode having a stripe electrode, and the mode order of the transverse modes is variable depending on the value of the injection current. For example, a $TE_{00}$ mode having only one peak, a $TE_{01}$ mode having two peaks and a $TE_{02}$ mode having three peaks in the electric field distribution along the junction plane in the laser diode appear respectively depending on suitable ranges of the injection current.

When, in such a case, a suitable bias current is continuously supplied to the laser diode, a slight variation in the injection current can cause hopping of the mode from one mode to another. The space distribution of the amplitude of the laser beam emitted from the laser diode is also varied due to the hopping of the mode. Thus, the amplitude modulation of the laser beam can be attained when a means which can selectively transmit a limited range of the space distribution of the light amplitude is disposed in the path of the laser beam.

Due to the fact that, in this method, the laser diode is continuously lasing by being energized by the bias current, the period of time required for the laser beam to respond to the variation in the injection current is remarkably reduced (generally to less than 1 nanosecond) and the laser beam can be modulated with a repetition frequency of the order of GHz. The power requirement for modulation is small due to the fact that the laser beam is modulated in response to a slight variation in the injection current when the value of the bias current is suitably selected. When the value of the bias current is set at the critical value in order to minimize the power requirement for modulation, variations in the ambient temperature may result in mal-operation of the laser diode. In order to avoid mal-operation, it is necessary to provide a suitable temperature control means for the laser diode and to employ light receiving means of precise construction. However, employment of such a temperature control means in the present invention would not in any way render the present invention disadvantageous in view of the fact that the prior art method of external modulation employing the opto-electrical crystal modulator requires frequently provision of similar temperature control means for the opto-electrical crystal.

Other objects, features and advantages of the present invention will be apparent from the following detailed description of some preferred embodiments thereof taken in conjunction with the accompanying drawing, in which:

FIG. 1b is a graph showing schematically some typical examples of transverse modes of laser emission obtained with the laser diode shown in FIG. 1a;

FIGS. 2b and 2c are photographs showing near field patterns and far field patterns respectively of the transverse modes obtained with the laser diode shown in FIG. 2a;

FIG. 3b is a block diagram showing a modification of the device shown in FIG. 3a;

FIG. 4b is a block diagram showing a modification of the device shown in FIG. 4a;

Figure 1A:
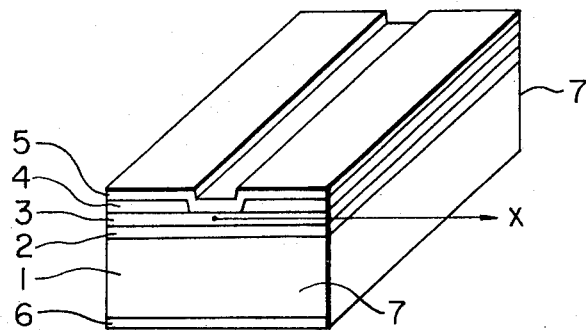
FIG. 1a is a perspective view showing schematically the basic structure of a laser diode having a stripe electrode employed in the present invention.

One form of the basic structure of a stripe-electrode laser diode employed in the present invention is shown in FIG. 1a in perspective fashion. Referring to FIG. 1a, the laser diode comprises an n-type GaAs substrate 1, an n-type GaAs layer 2, a p-type GaAs layer 3, an electrical insulator layer 4, a stripe electrode 5, an electrode 6 remote from the stripe electrode 5, and a pair of reflecting surfaces 7 of a resonator. In the laser diode, the x-direction is in parallel with the intersection between the pn junction plane and the reflecting surfaces.

Figure 1B:
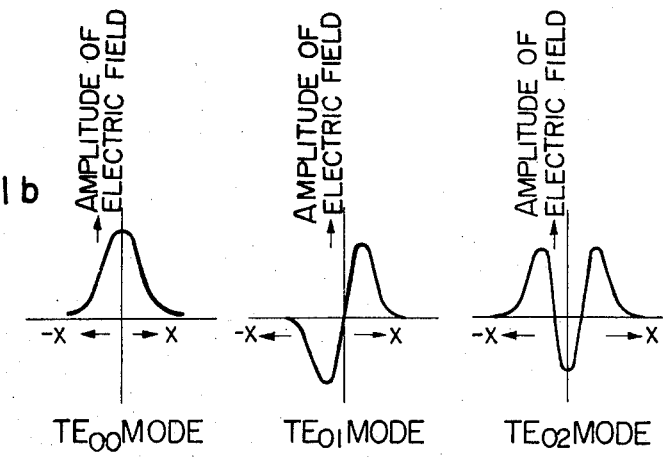

FIG. 1b shows schematically the amplitude distribution of $TE_{00}$, $TE_{01}$ and $TE_{02}$ modes of laser emission obtained with the laser diode shown in FIG. 1a. In FIG. 1b, the vertical axis represents the amplitude of the electric field of the laser beam taking the phase into account, and the horizontal axis represents the distance in the x-direction in the lasing region. Since this amplitude distribution represents the distribution of laser emission in the lasing region of the laser diode, it corresponds to the near field pattern. Further, the above amplitude distribution is generally similar to the Hermite-Gaussian distribution. Accordingly, the far field pattern (the diffracted image of the near field pattern) of the laser beam observed at a point sufficiently distant from the laser diode has also an amplitude distribution similar to the Hermite-Gaussian distribution. Thus, this far field pattern has an amplitude distribution similar to that shown in FIG. 1b, but the horizontal axis in this case represents the angle on the plane including the junction plane.

Figure 2A:
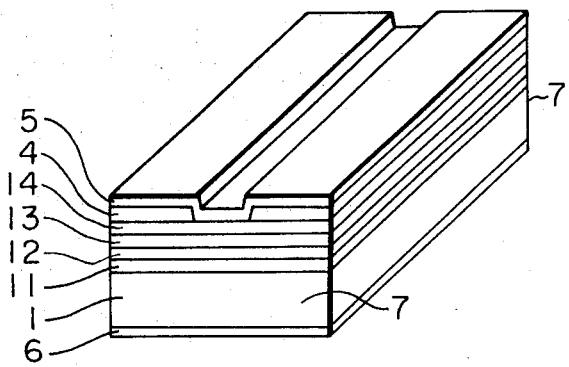
FIG. 2a is a perspective view showing schematically the structure of a stripe-electrode double-heterostructure laser diode employed in an embodiment of the present invention.

Referring to FIG. 2a showing schematically the structure of a stripe-electrode double-heterostructure laser diode employed in an embodiment of the present invention, an electrical insulator layer 4, a stripe electrode 5 and an opposite electrode 6 are provided on a crystal pellet comprising an n-type GaAlAs layer 11, a p-type GaAs layer 12, a p-type GaAlAs layer 13 and a p-type GaAs layer 14 grown successively on the surface of an n-type GaAs substrate 1 as in the structure shown in FIG. 1a, and a pair of parallel end surfaces 7 serve as reflecting surfaces of a resonator. Records of the near field patterns and far field patterns of a laser beam emitted from this laser diode are shown in photographs in FIGS. 2b and 2c respectively. It is apparent by reference to FIG. 1b that these three kinds of photographs correspond to the $TE_{00}$ mode, $TE_{01}$ mode and $TE_{02}$ mode respectively. The $TE_{00}$ mode shown in FIGS. 2b and 2c appeared with an injection current value lying within the range of 720 to 740 mA, the $TE_{01}$ mode with an injection current value lying within the range of 740 to 760 mA, and the $TE_{02}$ mode with an injection current value lying within the range of 760 to 800 mA. It will thus be seen that the mode hopping occurs in this laser diode at the injection current values of 740 mA and 760 mA.

Figure 3A:
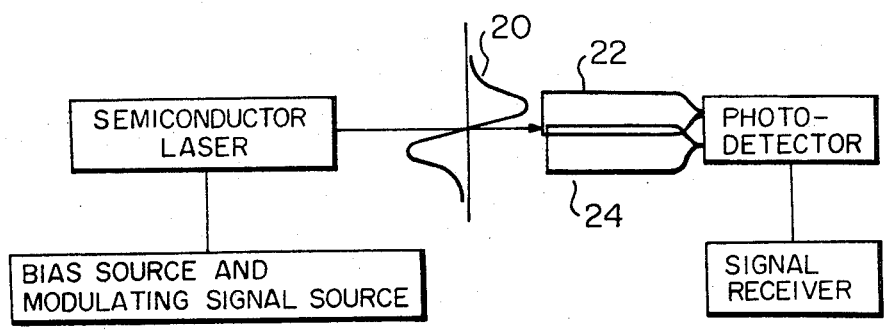
FIG. 3a is a block diagram showing diagrammatically the structure of a device preferably used for the practice of the method of the present invention.

A method according to the present invention utilizes the fact that adjacent amplitude peaks are opposite to each other in the phase as seen in the $TE_{01}$ mode and $TE_{02}$ mode shown in FIG. 1b. Referring to FIG. 3a showing a block diagram of an arrangement preferably used for the practice of the method above described, a bias source and a modulating signal source are connected to a semiconductor laser of the structure shown in FIG. 2a and the semiconductor laser emits a laser beam of $TE_{01}$ mode 20 in the state in which the signal current is zero. A pair of optical guides 22 and 24 such as glass fiber means having the same optical path length are disposed in the path of the laser beam so as to receive separately the two peaks of the laser beam. These optical guides 22 and 24 are connected at the end remote from the light receiving end to a photo-detector which may be an avalanche photo-diode, PIN photo-diode or the like. The output end of the photo-detector is connected to a signal receiver. In such an arrangement, the two portions of the laser beam transmitted through the respective optical guides 22 and 24 to reach the photo-detector cancel each other due to the fact that they are opposite to each other in the phase, and therefore, no electrical signal appears from the signal receiver. In the state in which a predetermined modulating signal current in the form of a pulse train is supplied to the semiconductor laser, a laser beam of $TE_{00}$ mode or $TE_{02}$ mode is emitted from the semiconductor laser. Since these modes have an amplitude distribution of even symmetry with respect to the direction of laser beam propagation, the two portions of the laser beam transmitted through the respective optical guides 22 and 24 to be detected by the photo-detector are of the same phase and an electrical signal appears from the signal receiver.

In an experiment in which a bias current of 755 mA was supplied to the stripe-electrode double-heterostructure laser diode shown in FIG. 2a and a modulating signal current of 10 mA was turned on and off, the mode of the laser beam hopped between $TE_{02}$ and $TE_{01}$ and a modulation depth of 10 dB was obtained. Further, the power requirement for modulation was about 10 mW when the on-off duty ratio was 0.5. In the arrangement shown in FIG. 3a, the laser beam emitted from the semiconductor laser enters directly the optical guides, and thus, the far field patterns of laser emission propagate through these optical guides.

Figure 3B:
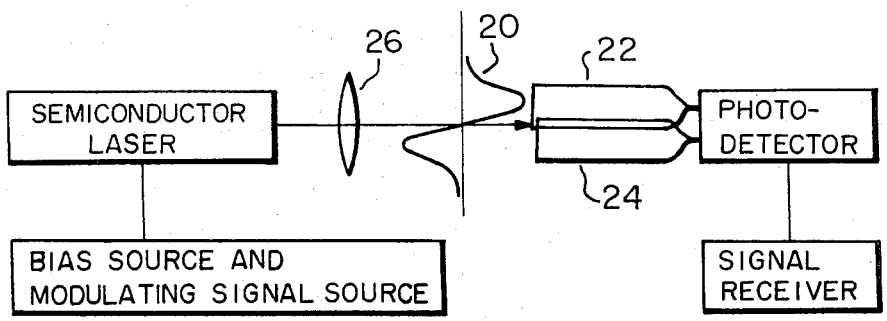

Referring to FIG. 3b showing a modification of the arrangement shown in FIG. 3a, a lens system 26 is additionally disposed between the semiconductor laser and the optical guides 22 and 24. When, in this modification the light receiving end of the optical guides 22 and 24 is disposed in the focal plane of the lens system 26, the far field patterns enter the optical guides 22 and 24 to propagate therethrough. On the other hand, when the light receiving end of the optical guides 22 and 24 is disposed in the plane in which the image of the laser beam emitting surface is formed by the lens system 26, the near field patterns enter the optical guides 22 and 24 to propagate therethrough. The use of the lens system 26 is advantageous in that the emitted and diffracted laser beam can be efficiently utilized.

In the arrangements shown in FIGS. 3a and 3b, means such as an optical crystal for adjusting the optical path length may be disposed in the path of the laser beam for producing a desired optical path difference between the laser beam portions propagating through the optical guides 22 and 24. In such a case, the laser beam of $TE_{01}$ mode having an amplitude distribution of odd symmetry produces an electrical signal and the laser beam of another mode having an amplitude distribution of even symmetry does not produce any electrical signal.

The above description has referred to an arrangement in which a pair of optical guides are disposed for the selective transmission and detection of one of a pair of modes produced due to mode hopping and a photodetector detects the selected mode for generating an electrical signal. However, a single optical guide may be provided in lieu of the two optical guides for the selective transmission and detection of one of a pair of modes.

Figure 4A:
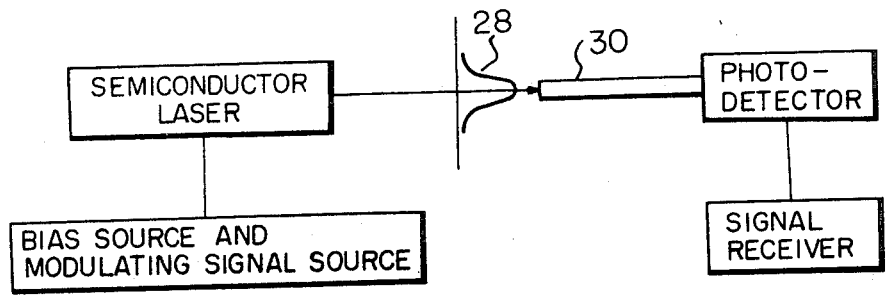
FIG. 4a is a block diagram showing diagrammatically the structure of another device preferably used for the practice of the method of the present invention.

Referring to FIG. 4a, a single optical guide 30 is disposed on the central axis of a laser beam emitted from a semiconductor laser and is connected to a photodetector. This optical guide 30 is so sized that the diameter of the light receiving end thereof is substantially equal to or smaller than the width of the peak of the laser beam incident upon the light receiving end. Thus, the laser beam of $TE_{00}$ mode 28 or $TE_{02}$ mode having an amplitude distribution of even symmetry enters the optical guide 30 with strong intensity to propagate through the optical guide 30 and a clear electrical signal appears from a signal receiver. When, however, the mode hops due to the application of a modulating signal and another mode of odd symmetry such as $TE_{01}$ is produced, a very weak electrical signal will be generated by the signal receiver due to the fact that the value of this odd symmetry mode on the control axis is very small. In this manner, a highly modulated electrical signal can be obtained.

Figure 4B:
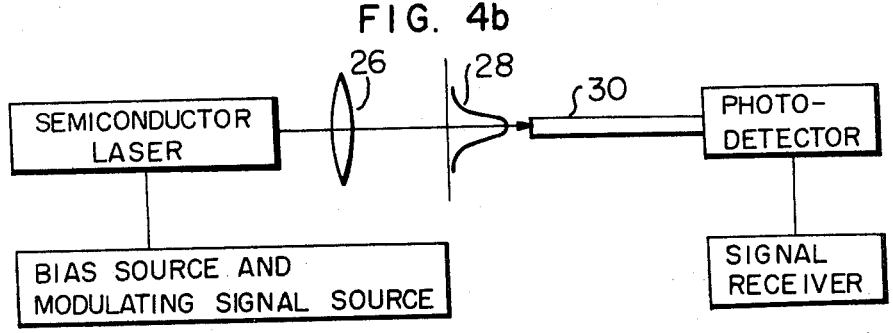

Referring to FIG. 4b, a lens system 26 is additionally provided in the arrangement shown in FIG. 4a. The operation in this case is the same as that described with reference to FIG. 4a. In the arrangement shown in FIG. 4b, the lens system 26 acts to control the amplitude distribution of the laser mode thereby adjusting the operation of the device.

Further, in the arrangements shown in FIGS. 4a and 4b, the beam cut-off property of the optical guide 30 can be utilized for selectively detecting one of the modes.

Generally, an optical guide can transmit the mode of the lowest order as a guided mode, but it acts to cut off modes of higher orders lying within a certain range.

Figure 5:
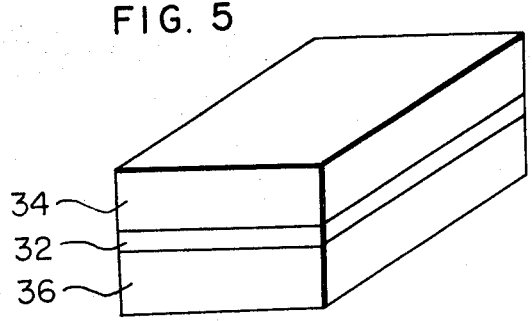
FIG. 5 is a perspective view showing schematically the structure of one form of the optical guide means used in the devices shown in FIGS. 4a and 4b.

Referring to FIG. 5, there is shown in perspective fashion a slab type optical guide of sandwich structure by way of example. The optical guide shown in FIG. 5 comprises an intermediate layer 32 sandwiched between a pair of layers 34 and 36, and this intermediate layer 32 has a refractive index greater than those of the layers 34 and 36. This optical guide would not transmit beams of higher orders incident thereupon when the thickness of the intermediate layer 32 is selected to be smaller than a predetermined value. Thus, when this optical guide is used as the optical guide 30 shown in FIGS. 4a and 4b, the laser beam of $TE_{00}$ mode is selectively transmitted and detected and other laser beams of higher order produced due to mode hopping are not detected.

The slab type optical guide of sandwich structure shown in FIG. 5 may be made by successively sputtering glass layers having desired refractive indices on a base plate of glass or by successively epitaxially growing different semiconductor layers on a semiconductor substrate. Further, a coaxial type optical guide having a beam cut-off property may be used in lieu of the optical guide of sandwich structure.

What we claim is:

1. A device for directly modulating a semiconductor laser comprising:

a semiconductor injection laser diode having a PN junction, said PN junction emitting a laser beam of one mode-order in response to the injection of a bias current of a level above the laser threshold level;

a bias source connected with said laser diode to inject said bias current thereto;

a modulating source connected with said laser diode and said bias source to inject and superpose a signal current pulsed on and off according to an information signal to cause said laser beam to hop from one mode order to another mode order; and an optical waveguide, disposed in the path of said emitted laser beam, said optical waveguide being able to transmit only one of said two mode orders, said optical waveguide including a pair of separate portions, said separate portions being arranged in a symmetrical manner on opposite sides of the center of the field distribution of said emitted laser beam corresponding to one of said two mode orders, and being formed in such a manner that laser beams passing through said separate portions are joined together thereafter, whereby the amplitude of the laser beam emitted from said optical waveguide is an optical signal representative of the information signal pulses imparted to said modulating source and has the odd symmetry field distribution cancelled by said optical waveguide.

2. A device for modulating directly a semiconductor laser according to claim 1, wherein said semiconductor injection laser diode has a stripe electrode.

3. A device for modulating directly a semiconductor laser according to claim 2, wherein said semiconductor injection laser diode is made of a crystal having a double heterojunction.

4. A device for modulating directly a semiconductor laser according to claim 1, further including a lens system disposed in the path of said emitted laser beam between said laser diode and said optical waveguide to control the field distribution of said emitted laser beam at the light receiving end of said optical waveguide.

5. A device for directly modulating a semiconductor laser comprising:

a semiconductor injection laser diode having a PN junction said PN junction emitting a laser beam of one mode-order in response to the injection of a bias current of a level above the laser threshold level;

a bias source connected with said laser diode to inject said bias current thereto;

a modulating source connected with said laser diode and said bias source to inject and superpose a signal current pulsed on and off according to an information signal to cause said laser beam to hop from one mode-order to another mode-order; and an optical waveguide, disposed in the path of said emitted laser beam, said optical waveguide being able to transmit only one of said two mode-orders, said optical waveguide including a pair of separate portions, said separate portions being arranged in a symmetrical manner on opposite sides of the center of the field distribution of said emitted laser beam corresponding to one of said two mode-orders, and being formed in such a manner that laser beams passing through said separate portions are joined together thereafter, whereby the amplitude of the laser beam emitted from said optical waveguide is an optical signal representative of the information signal pulses imparted to said modulating source; and further comprising means, coupled with said optical waveguide, for producing an optical path difference, so as to cancel the emitted laser beam having an even symmetry field distribution.

6. A device for directly modulating a semiconductor laser according to claim 5, wherein said semiconductor injection laser diode has a stripe electrode.

7. A device for directly modulating a semiconductor laser according to claim 6, wherein said semiconductor injection laser diode is made of a crystal having a double heterojunction.

8. A device for directly modulating a semiconductor laser according to claim 5, further including a lens system disposed in the path of said emitted laser beam between said laser diode and said optical waveguide to control the field distribution of said emitted laser beam at the light receiving end of said optical waveguide.

9. A method for directly modulating a semiconductor injection laser diode comprising the steps of:
   a. supplying a bias current to said diode to inject a bias current of a level above the laser threshold level, so that the PN junction of said laser diode emits a laser beam of one mode-order;
   b. superposing a signal current, which is pulsed on and off according to an information signal, on said bias current to cause said laser beam to hop from one mode-order to another mode-order; and
   c. passing said emitted laser beam through an optical waveguide which is able to transmit only one of said two mode-orders, said optical waveguide having a pair of separate portions, said separate portions being arranged in a symmetrical manner on opposite sides of the center of the field distribution of said emitted laser beam corresponding to one of said two mode-orders, and being formed in such a manner that laser beams passing through separate portions are joined together thereafter, whereby the amplitude of the emitted laser beam from said optical waveguide is an optical signal representation of the information signal pulses forming said superimposed signal current, and has an odd symmetry field distribution cancelled by said optical waveguide.

10. A method of modulating directly a semiconductor laser according to claim 9, wherein said mode-orders are selected from the group consisting of a $TE_{00}$ mode, $TE_{01}$ mode and $TE_{02}$ mode.

11. A method of modulating directly a semiconductor laser according to claim 9, wherein said current signal is a PCM signal current, whereby said laser beam is pulse-code modulated.

12. A method for directly modulating a semiconductor injection laser diode according to claim 9, further including the step of
   d. disposing a lens system in the path of the emitted laser beam between said laser diode and said optical waveguide, to control the field distribution of the emitted laser beam at the light receiving end of said optical waveguide.

13. A method for directly modulating a semiconductor injection laser diode comprising the steps of:
   a. supplying a bias current to said diode to inject a bias current of a level above the laser threshold level, so that the PN junction of said laser diode emits a laser beam of one mode-order;
   b. superimposing a signal current, which is pulsed on and off according to an information signal, on said bias current to cause said laser beam to hop from one mode-order to another mode-order; and
   c. passing said emitted laser beam through an optical waveguide which is able to transmit only one of said two mode-orders, said optical waveguide having a pair of separate portions, said separate portions being arranged in a symmetrical manner on opposite sides of the center of the field distribution of said emitted laser beam corresponding to one of said two mode-orders, and being formed in such a manner that laser beams passing through separate portions are joined together thereafter, whereby the amplitude of the emitted laser beam from said optical waveguide is an optical signal representation of the information signal pulses forming said superimposed signal current; and further including the step of
   d. disposing means for producing an optical path difference in the path of the emitted laser beam, so as to cancel the emitted laser beam having an even symmetry field distribution.

14. A method for directly modulating a semiconductor injection laser diode according to claim 13, wherein said mode-orders are selected from the group consisting of a $TE_{00}$ mode, $TE_{01}$ mode and $TE_{02}$ mode.

15. A method for directly modulating a semiconductor injection laser diode according to claim 13, wherein said signal current is a PCM signal current, whereby said laser beam is pulse-code modulated.

16. A method for directly modulating a semiconductor injection laser diode according to claim 13, further including the step of
   e. disposing a lens system in the path of the emitted laser beam between said laser diode and said optical waveguide, to control the field distribution of the emitted laser beam at the light receiving end of said optical waveguide.

* * * * *